United States Patent Office 3,438,386
Patented Apr. 15, 1969

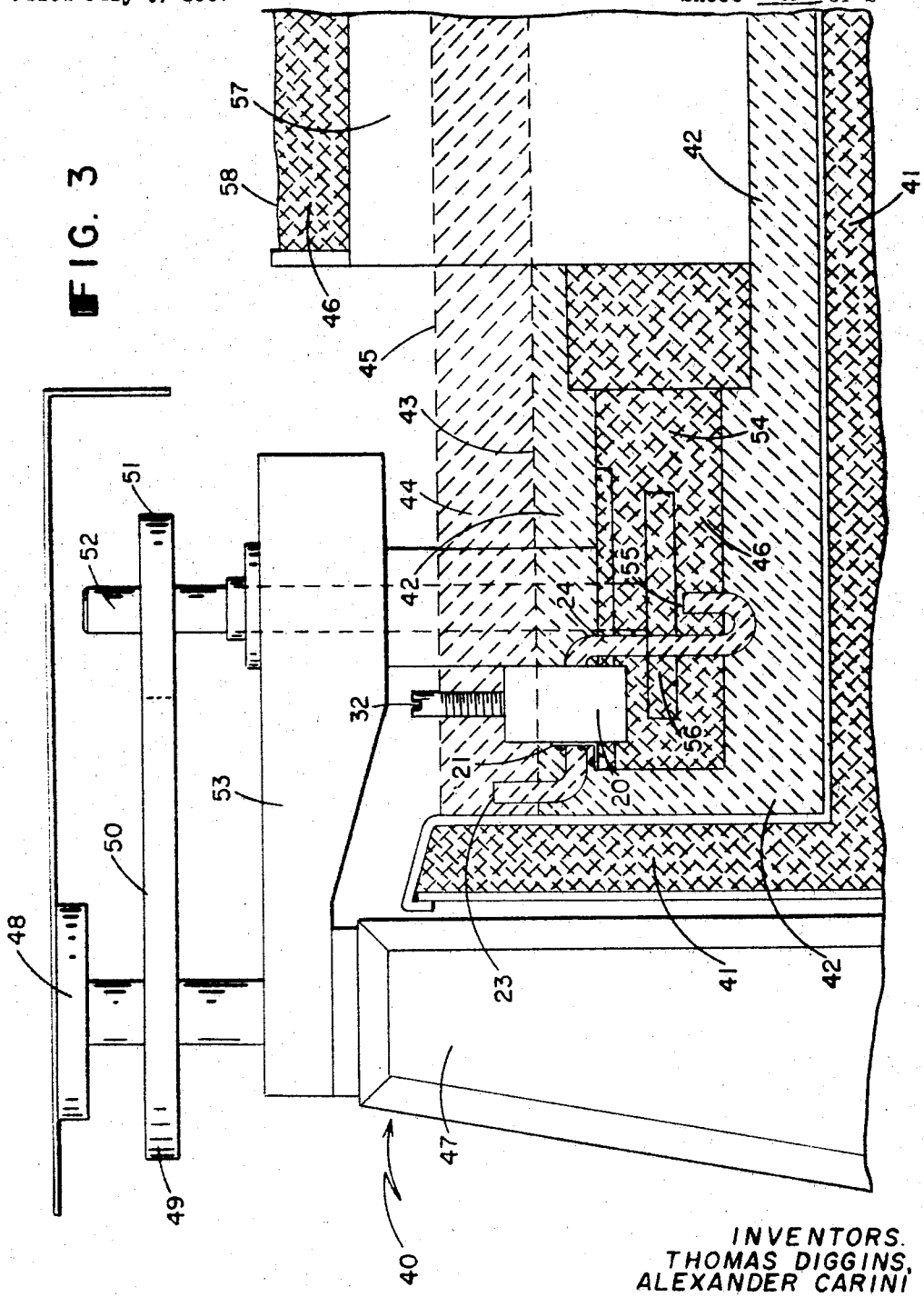

3,438,386
TWO LIQUID MEASURING DEVICES
Thomas Diggins, 4 Santerre St., Nashua, N.H. 03060; and Alexander Carini, 5 Farley St.; and Kenneth Boynton, Osgood Road, both of Milford, N.H. 03055
Filed July 5, 1967, Ser. No. 651,222
Int. Cl. B67d 5/56; F04f 1/18
U.S. Cl. 137—154                                    8 Claims

ABSTRACT OF THE DISCLOSURE

A submerged measuring device which can be adjusted to admit the simultaneous passage through it of varied predetermined amounts of a liquid of very high specific gravity and a liquid of very low specific gravity; the lighter liquid being drawn down and into the device by means of a vacuum created at its outlet and the heavier liquid forcing its passage into the device, due to the pressure of its weight as compared to that of the lighter liquid.

---

This invention relates to valves and particularly to measuring devices for controlling the simultaneous flow therein of oil, or a liquid of low specific gravity, and solder, or a liquid of high specific gravity, as used in mass fountain soldering machines using a wave of solder and oil or solder alone.

Present devices performing this function operate on the principle of supplying and metering the oil directly into the machine. Because of contaminants in the oil, the mechanical valves in the oil line often clog up at the seating surfaces, finally shutting off by themselves. Also, if the seats of the valves become worn or clogged, some oil will leak through, preventing the use of solder alone when required in the operation of the machine.

Our device differs from the ordinary conception of a valve in that the complete device, while containing a mechanical valve as a part thereof, is not directly or physically connected to any pipe or conduit, the flow through which it attempts to control. In addition to a conventional valve, the device employs the use of a vacuum and the force of a heavy liquid seeking its own level, thereby displacing a lighter liquid which it controls, when required.

A primary object of this invention is to provide a device, wherein, as with a soldering machine in operation, the flow of oil can be stopped, or the flow of solder can be stopped or predetermined combinations of solder and oil can simultaneously be allowed to flow to the machine.

Among the further objects and advantages of this invention may be mentioned:

Perfect seating of the valve head is not absolutely essential, as a small amount of solder leakage at the valve seat will not materially affect the flow of oil.

Impurities or particles in the oil cannot foul the valve seating surface as only solder passes over the seat.

In accordance with our invention there is produced a unitary adjustable measuring device which is efficient and reliable, while a full range of oil and solder control is obtained by simply turning a readily accessible screw.

The features of novelty which are believed to be characteristic of this invention will hereinafter appear from the following description and specification of a preferred embodiment as shown in the accompanying drawings in which.

Figure 1:
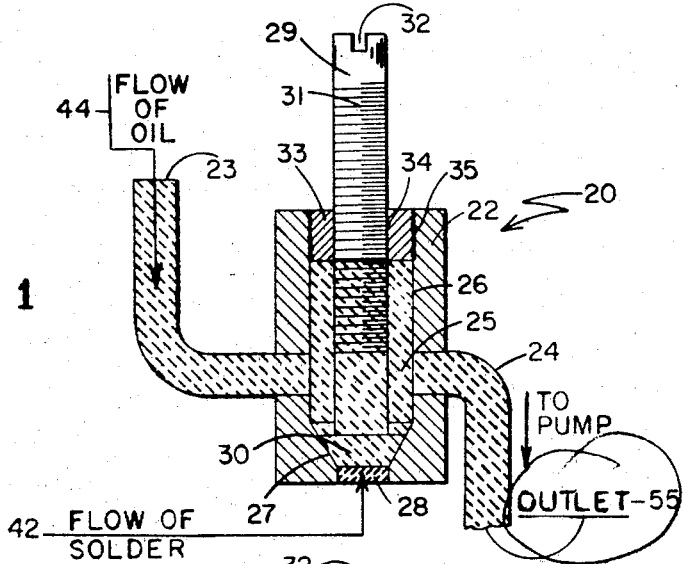
FIG. 1 is a sectional diagrammatic view of the device in a closed position permitting the flow of oil only through the device into a pump inlet and not admitting any solder.
Figure 2:
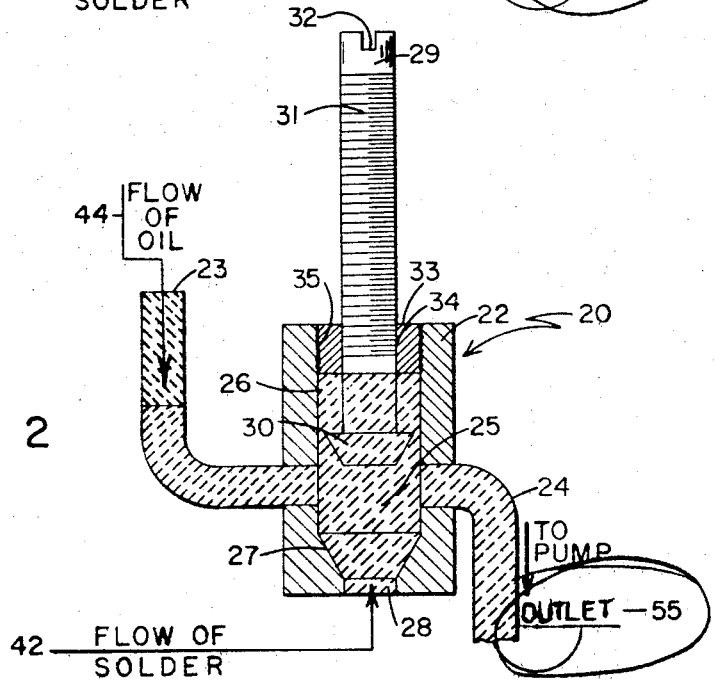
FIG. 2 is a sectional diagrammatic view of the device in an open position permitting the flow of solder only through the valve and not admitting any oil.

FIG. 3 is a sectional diagrammatic view of a solder and oil soldering fountain wave soldering machine using a vertical wave of solder and oil, showing the position of the device relative to the upper floating oil supply, the lower solder supply, the pump, the pump inlet, the solder sump, and the vertical soldering wave, the device being in an intermediate position (not shown) admitting both oil and solder.

Referring to the drawings, the device therein shown, as illustrative of one embodiment of our invention comprises a measuring device 20 held in position by a supporting bracket 21. The device 20 has an outside body portion 22 into which there is connected an upper oil inlet tube 23 and a lower oil and/or solder outlet tube 24 leading to the pump inlet 56. The interior cavity 25 of the body 22 has a cylindrical bore 26 internally threaded at its upper portion. The lower portion of the interior cavity 25 has a truncated conical bottom valve seat 27 extended at its bottom by an intermediate inlet 28. A vertical valve adjusting rod 29 has attached to it on its lower end a truncated conical valve head 30 designed to snugly seat itself on the truncated conical bottom seat 27. The upper end of rod 29 has an exterior threaded portion 31 and a slotted adjusting head 32. The flat cylindrical plug 33 is threaded internally at 34 to engage with the threads 31 on the adjusting rod 29 and is threaded externally at 35 to engage with the upper interior threads on cylindrical bore 26.

The device is preferably used in a pump, valve, and sump assembly producing a vertical wave of solder and oil used in mass fountain soldering machines, comprising an insulated solder and oil reservoir 41 containing hot liquid solder 42. On the top surface 43 of the solder 42 there is a floating layer of oil 44 with a top surface 45. The device may also be used with any two liquids having sufficient divergence in specific gravities so that the lighter liquid will float on top of the heavier liquid.

The device is submerged in the reservoir 41 containing solder and oil with its lower portion positioned in the liquid solder 42 and its upper portion positioned in the floating layer of oil 44. The open end of the upper inlet tube 23 is positioned in the layer of oil 44 and below the top surface 45 of the oil with the slotted end 32 of the valve adjusting rod 29 extending above the surface 45. With the valve partially opened, a mixture of solder and oil 46 flows from the lower outlet tube 55.

The solder and oil soldering wave assembly 40 has a framework 47 supporting a pump motor 48 to which is attached a driving pulley 49 from which a belt 50 is connected to a driven pump pulley mounted on a centrifugal pump shaft positioned through a pump supporting bracket 53.

The pump casing 54 also houses the open end of the lower outlet tube 55 leading from the device, the orifice of the tube 55 being positioned below and closely adjacent to the inlet of the impeller 56 of a centrifugal pump connected to sump 57 of the wave producing machine which emits a vertical wave 58 of solder, oil, or a combination of solder and oil depending on the predetermined position of the valve head 30.

In operation, the valve head 30 is adjusted in accordance with the type of soldering results desired, from a wave of oil alone if necessary to varied combinations of solder and oil or to solder alone.

For oil alone, the conical valve head 30 is firmly seated on the conical valve seat 27 by lowering the valve adjusting rod 29 to its lowest position using a screw driver in slot 32 which is positioned above the top surface of the oil for safe and ready access. This excludes the liquid solder from entering the orifice 28. The oil flows by gravity down the upwardly extending tube 23 through the upper inlet orifice filling the cavity 25 and thence through the downwardly extending common outlet orifice 55 and into the inlet of the centrifugal pump 56. In addition to the effect of gravity, suction at the inlet of the pump impeller cretaes a vacuum by cavitation which draws the oil 44 down through the tubes and the interior cavity into the pump. For solder alone, the conical valve head 30 is raised from the valve seat 27, which is positioned adjacent to the intermediate orifice 28, by turning the valve adjusting rod to which the valve head is attached, to a fully open position. The solder enters at solder inlet 28 and rises as it seeks its own level, and fills the cavity 25 and moves up into the tube 23, gradually choking off the oil flow so that solder alone flows through the tube 24 to the pump.

For a mixture of oil and solder, when the valve head 30 is gradually lifted from valve seat 27, solder begins to seep through the opening between the valve head 30 and the valve seat 27. Since the solder is heavier than oil, in attempting to seek its own level, some of it is forced up through the intermediate opening 28 with the oil also flowing as heretofore described, allowing a combination of oil and solder to fill the cavity and then flow out to the pump. Thus by turning the valve rod 29, the amount of solder and oil simultaneously flowing through the device can be closely controlled.

We claim:

1. A unitary adjustable measuring device for controlling the simultaneous flow therein of a liquid of low specific gravity and a liquid of high specific gravity, said liquids having sufficient divergence in weights so that the lighter liquid will float on top of said heavier liquid, said device being submerged in a reservoir of said liquids, the upper portion being positioned in said lighter liquid and the lower portion being positioned in said heavier liquid, said device comprising a body portion enclosing a valve head and seat, an upper inlet orifice having an upwardly extending tube for said lighter liquid, an intermediate open inlet orifice for said heavier liquid positioned in said heavier liquid, and a lower downwardly extending common outlet orifice extended by a tube with an open end for both liquids, said valve seat being positioned adjacent to said intermediate orifice inlet, said valve head being provided with operating means for raising and lowering said head, the outer end of said operating means extending above said lighter liquid.

2. A unitary adjustable measuring device in accordance with claim 1, wherein said lighter liquid is drawn into and through said tubes and body portion by gravity and by means of a vacuum introduced at the open end of said tube extending from said lower common outlet.

3. A unitary adjustable measuring device in accordance with claim 1, wherein said heavier liquid enters said intermediate inlet orifice seeking its own level when said valve head is raised from said valve seat.

4. In a mass soldering machine using a vertical wave of molten solder and oil activated by the operation of a centrifugal pump, a unitary adjustable measuring device for controlling the amount of solder and oil supplied to said wave, said device being submerged in a reservoir of molten solder with a layer of oil floating on top of said solder, the upper portion of said device being positioned in said oil and the lower portion being positioned in said solder, said device comprising a body portion, enclosing a valve head and seat, an upper inlet orifice and tube extending upwardly from said orifice for the flow of said oil, the upper end of said oil inlet tube being open and positioned in said layer of oil, an intermediate inlet orifice for said solder positioned in said solder and a lower downwardly extending common outlet orifice extended by a tube with an open end for both solder and oil, said open end being positioned contiguous to the impeller of said pump.

5. A unitary adjustable measuring device in accordance with claim 4, wherein said oil is drawn into and through said tubes and body by gravity and by cavitation producing a vacuum contiguous to said impeller, said solder entering said intermediate inlet orifice seeking its own level when said valve is open.

6. A unitary adjustable measuring device in accordance with claim 4 wherein said valve seat is positioned adjacent to said intermediate inlet orifice, said valve head being provided with positioning means for being raised and lowered, the adjusting end of said positioning means extending above the top surface of the layer of said oil.

7. A unitary adjustable measuring device for controlling the flow therethrough of a liquid of low specific gravity, a liquid of high specific gravity and a combination of both liquids, said liquids having sufficient divergence in specific gravities so that the lighter liquid will float on top of the heavier liquid, the body of said device enclosing an upper inlet positioned in said lighter liquid, an intermediate inlet, with associated interior valve, positioned in said heavier liquid, and a lower outlet for the passage of both liquids.

8. A unitary adjustably measuring device in accordance with claim 7, wherein there is provided means for drawing the liquid of low specific gravity through the device by application of a vacuum at said lower outlet, means for allowing the liquid of high specific gravity to enter said intermediate inlet seeking its own level and means for adjusting the admission and flow of both liquids simultaneously through said device.

References Cited

UNITED STATES PATENTS 1,708,380  4/1929  Deacon _____ 137—247.13

M. CARY NELSON, *Primary Examiner.*

J. R. DIVELLE, *Assistant Examiner.*

U.S. Cl. X.R.

137—565; 228—37